US010632561B2

(12) United States Patent
Smith et al.

(10) Patent No.: US 10,632,561 B2
(45) Date of Patent: Apr. 28, 2020

(54) WELD ELECTRODE PLUGS WITH POLYMERIC INSERTS FOR LOSS-OF-COOLING DETECTION IN WELDING SYSTEMS

(71) Applicant: GM GLOBAL TECHNOLOGY OPERATIONS LLC, Detroit, MI (US)

(72) Inventors: Anthony L. Smith, Troy, MI (US); Joseph L. Jablonski, Linden, MI (US); Richard J. Skurkis, Lake Orion, MI (US); Nicholas W. Pinto, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 331 days.

(21) Appl. No.: 15/723,484

(22) Filed: Oct. 30, 2017

(65) Prior Publication Data

US 2019/0099830 A1    Apr. 4, 2019

(51) Int. Cl.
| | |
|---|---|
| *B23K 11/30* | (2006.01) |
| *B23K 9/32* | (2006.01) |
| *B23K 9/095* | (2006.01) |
| *B23K 9/173* | (2006.01) |
| *B23K 11/25* | (2006.01) |
| *B23K 11/31* | (2006.01) |
| *F16K 31/00* | (2006.01) |

(52) U.S. Cl.
CPC ........ *B23K 11/3018* (2013.01); *B23K 9/0956* (2013.01); *B23K 9/173* (2013.01); *B23K 9/323* (2013.01); *B23K 11/25* (2013.01); *B23K 11/252* (2013.01); *B23K 11/255* (2013.01); *B23K 11/3054* (2013.01); *B23K 11/31* (2013.01); *F16K 31/002* (2013.01); *Y10T 137/7762* (2015.04)

(58) Field of Classification Search
CPC ...... B23K 9/173; B23K 9/323; B23K 9/0956; B23K 11/3018; Y10T 137/7762
USPC ................. 219/120; 73/766, 117; 72/777
See application file for complete search history.

(56) References Cited

U.S. PATENT DOCUMENTS

| | | | |
|---|---|---|---|
| 4,650,152 A * | 3/1987 | Doutt | B23K 11/3018 137/466 |
| 5,504,299 A * | 4/1996 | Heckendorn | B23K 11/31 219/109 |
| 2016/0174353 A1* | 6/2016 | Mitra | B23K 10/00 219/121.44 |

FOREIGN PATENT DOCUMENTS

GB    2412897 A  * 10/2005  ............. B63B 13/00

* cited by examiner

*Primary Examiner* — Ibrahime A Abraham
*Assistant Examiner* — Dilnessa B Belay
(74) *Attorney, Agent, or Firm* — Quinn IP Law

(57) ABSTRACT

Disclosed are weld electrode plugs with polymeric inserts for loss-of-cooling detection, methods for making or for using such weld electrode plugs, and electric welding systems equipped with loss-of-cooling detection plugs. A disclosed loss-of-cooling detection assembly includes a plug that attaches to the weld shank of a welding system such that the plug fluidly couples to a coolant bore within the shank. The plug includes a plug body with a clearance hole extending therethrough. An insert detachably mounts to the plug such that the insert fluidly seals the clearance hole. This insert is fabricated from a polymeric material, such as a shape memory polymer, that alters a physical property, such as shape/size, of the insert responsive to changes in temperature and/or pressure of coolant fluid in the shank's bore. When this physical property is altered, the insert unseals the clearance hole causing a detectable leak of fluid from the shank.

20 Claims, 2 Drawing Sheets

WELD ELECTRODE PLUGS WITH POLYMERIC INSERTS FOR LOSS-OF-COOLING DETECTION IN WELDING SYSTEMS

INTRODUCTION

The present disclosure relates generally to welding techniques for joining multiple workpieces or operating on a single workpiece. More specifically, aspects of this disclosure relate to systems, methods, and devices for detecting loss of cooling in a fluid-cooled weld electrode of a resistance welding system.

Welding is a manufacturing, sculpting, and repair process that bonds materials, usually metals or thermoplastics, by causing coalescence—the process by which two separate units or adjacent sections of a single unit grow together, fuse, or merge into a single body/section. In a joining operation, two workpieces are fused together by liquefying or plasticizing (softening without liquefying) the areas to be bonded together, generally through the application of heat and/or pressure. For some welding techniques, a filler material is added to form a localized pool of molten material (a "weld puddle"). Promoting coalescence of the liquefied or plasticized materials, and subsequently allowing the coalesced materials to cool will solidify the bond. Welding can be used, for example, to permanently join two or more workpieces, to operate on a single workpiece (e.g., to repair a crack or join two ends), and to cut or pierce workpieces.

The quality of a weld is generally gauged by its strength and the strength of the material around the weld joint. Weld quality is influenced by numerous factors, the most significant factor being the method of welding. One such method is electric resistance welding (ERW)—colloquially "spot and seam welding"—which is a thermoelectric process that uses the electrical resistance of the workpiece material or materials to generate heat at the joint interface by passing an electrical current through the part(s). For some resistance welding processes, multiple workpieces are positioned between opposing weld electrodes, and a clamping force is applied via the electrodes. Electrical current is then passed between the electrodes through the adjoined workpieces. The dynamic resistance of the workpiece material generates heat at the faying interfaces (e.g., substrate-to-substrate interfacing surfaces), which momentarily melts the material at these interfaces. When the material cools, a solid weld joint or "nugget" is formed. Adhesive materials may be used at the faying interfaces to strengthen the weld nugget.

A standard weld electrode is fabricated with an electrically conductive shank that is connected to a resistance welder (or "weld gun"), and an electrically conductive weld cap, typically of copper alloy, that is either press-fit or threaded onto the distal end of the shank for transferring current from the weld gun to the workpieces. During a weld operation, the welding cap is held in close proximity to the weld region and, thus, the resultant weld heat; this results in significant amounts of heat energy being transferred to the cap. Efficiency of the resistance welding process is often improved by circulating a coolant fluid, such as water, through the shank to transfer heat from the weld cap into the coolant and thereby cool the shank and cap. One type of water-cooled weld cap system employs a coolant pump to transfer cooling fluid from a coolant source through a nozzle tube that is coupled to a distribution manifold within the shank. The tube is maintained in a fixed position relative to the electrode to ensure that the tube outlet is spaced from the cap. The nozzle tube directs a quantity of coolant towards the underside of the cap; the heated coolant is then evacuated from the weld electrode through an internal exit port.

SUMMARY

Disclosed herein are weld electrode plugs with heat-sensitive inserts for loss-of-cooling detection in a welding system, methods for making and methods for using such weld electrode plugs, and an electric welding apparatus employing liquid-cooled weld electrodes equipped with a plug and heat-sensitive insert designed to help detect unintentional increases in weld electrode temperature. By way of example, there is presented a novel robotic welding cell with opposing liquid-cooled weld electrodes that each utilize a shape memory polymer (SMP) disc embedded within a threaded plug installed in the shank. When operating within normal temperature ranges, the SMP disc retains a threaded, snap-fit, interference-fit, or other mating engagement to retain cooling system pressure. If interruption or loss of cooling occurs, the weld electrode's operating temperature will increase, causing the modulus of the SMP disk to decrease (soften) and, thus, release its mating engagement with the plug. As a result, the insert is ejected from the plug by cooling fluid pressure, and the robotic cell's cooling system control logic will detect a fluid leak. Loss-of-cooling detection protocol within the system's control logic will generate a maintenance notification and shut down the robotic welding cell.

Attendant benefits for at least some of the disclosed concepts include efficient and expeditious detection of weld electrode cooling loss in a liquid-cooled weld system. When a weld electrode loses cooling, the weld cap tends to mushroom and lose current density, which may cause discrepant welds and damage to the cap and shank. Fast, reliable detection of cooling loss helps to abate electrode damage and reduce the number of discrepant welds. This, in turn, reduces costs associated with reworking the welds, replacing improperly welded workpieces, downtime in welding equipment, repairing or replacing weld electrodes, etc. Another potential advantage of disclosed weld shank plug assemblies is that SMP inserts are not sensitive to electromagnetic interference (EMI) from the weld gun electronics and, thus, offer more reliable loss-of-cooling detection. This solution also eliminates the need for high-cost thermal sensors and the requisite space for packaging such sensors.

Aspects of the present disclosure are directed to weld electrode plugs with heat and/or pressure-sensitive polymeric inserts for detecting loss or drops of weld electrode cooling functionality in a liquid-cooled electric weld apparatus. For instance, there is presented herein a loss-of-cooling detection assembly for a weld electrode of a welding system. The weld electrode includes an electrically conductive weld cap that is mounted to a distal end of a weld shank. The welding system is equipped with a cooling subsystem composed of a supply conduit that fluidly couples a coolant fluid source to a coolant bore within the weld shank. The loss-of-cooling detection assembly includes a plug that threads into or otherwise physically attaches to the weld shank such that the plug is fluidly coupled to the shank's coolant bore. The plug is fabricated with an elongated, frustaconical plug body having a clearance hole that extends therethrough, e.g., to create a leak path for the coolant bore. An insert is detachably mounted on or in the plug body such that the insert fluidly seals or otherwise obstructs the clearance hole. This insert is fabricated, in whole or in part, from a polymeric material designed to alter the shape, size, and/or other physical property of the insert in response to a predetermined change in temperature and/or pressure of coolant fluid in the coolant bore. When this physical property is altered, the insert detaches from the plug body or otherwise unseals the clearance hole, thereby causing a detectable leak in fluid from the bore of the shank.

Other aspects of this disclosure are directed to electric weld system architectures with liquid-cooled weld electrodes stock equipped or retrofit with loss-of-cooling detection plug assemblies designed to help sense unintentional loss of or interruptions in cooling functionality. In an example, an electric welding system is presented that includes one or more electrically conductive weld electrodes, each comprised of a weld shank with a weld cap mounted to a distal end of the shank. This weld shank defines therein a coolant bore for distributing coolant fluid to an inside surface of the weld cap. The electric welding system, which may be in the nature of a robotic weld cell, also includes a coolant subsystem with a supply conduit that fluidly couples a coolant fluid source to the shank's coolant bore, a pump operable to circulate coolant fluid through the coolant bore, and a differential flow sensor operable to detect differences in coolant fluid flow between the supply and return lines of the cooling subsystem. The welding system also includes one or more loss-of-cooling detection assemblies, each of which is composed of a plug and an insert detachably mounted inside the plug. The insert is securely attached to the weld shank, and fluidly coupled to the shank's coolant bore. This plug includes a rigid plug body with a clearance hole that extends all the way through the plug body. The insert obstructs and fluidly seals the clearance hole. This insert is fabricated from a shape memory polymer material that alters the shape of the insert responsive to a predetermined temperature differential of the coolant fluid in the coolant bore. With this alteration, the insert detaches from the plug body and unseals the clearance hole.

Additional aspects of this disclosure are directed to methods for making and methods for using weld shank loss-of-cooling detection plug assemblies. Presented, for example, is a method of assembling a loss-of-cooling detection assembly for a weld electrode of a welding system. The representative method includes, in any order and in any combination with any of the disclosed features and options: attaching a plug to a weld shank such that the plug is fluidly coupled to a coolant bore within the shank, the plug including a plug body with a clearance hole; and, attaching an insert to the plug body such that the insert fluidly seals the clearance hole. This insert is fabricated from a polymeric material that is configured to alter at least one physical property of the insert, responsive to a predetermined change in temperature and/or pressure of coolant fluid in the coolant bore, and thereby unseal the clearance hole.

The above summary is not intended to represent every embodiment or every aspect of the present disclosure. Rather, the foregoing summary merely provides an exemplification of some of the novel concepts and features set forth herein. The above features and advantages, and other features and advantages of the present disclosure, will be readily apparent from the following detailed description of illustrative embodiments and representative modes for carrying out the present disclosure when taken in connection with the accompanying drawings and the appended claims. Moreover, this disclosure expressly includes any and all combinations and subcombinations of the elements and features presented above and below.

Figure 1:
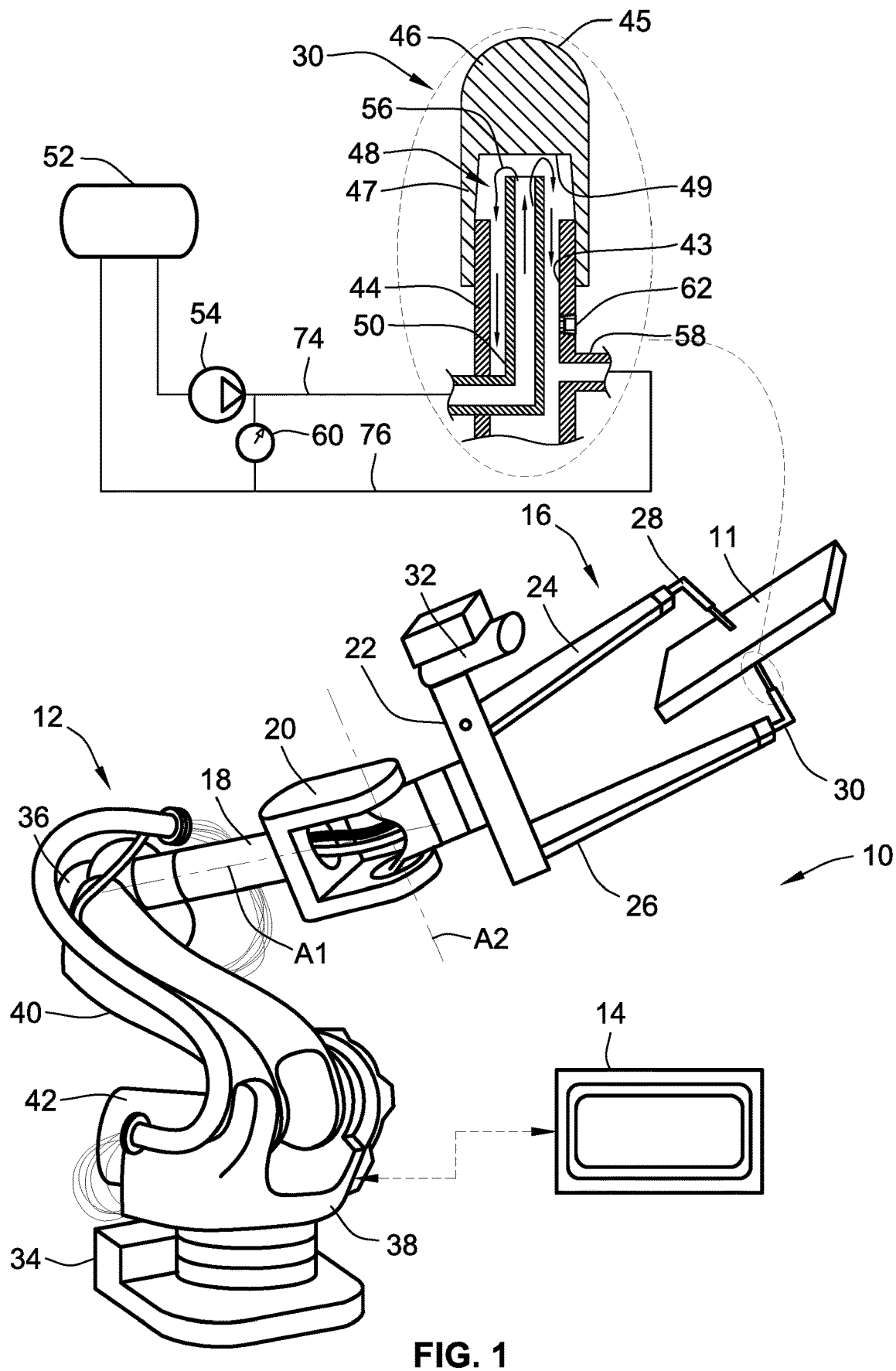
FIG. 1 is an elevated perspective-view illustration of a representative electric welding system with an inset view of a representative weld electrode equipped with a loss-of-cooling detection assembly in accordance with aspects of the present disclosure.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad aspects of the disclosure. To that extent, elements and limitations that are described, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example.

In an electric welding apparatus, loss of cooling to a weld electrode may lead to weld cap overheating. This overheating may cause the weld cap contact surface area to increase, resulting in reduced current density and, thus, discrepant welds. Aspects of the disclosed concepts are directed to a loss-of-cooling detection assembly that utilizes a disc-shaped insert that is fabricated from a heat or pressure-sensitive plastic, such as shape memory polymer (SMP), and is embedded in a small (e.g., ⅛ inch male) National Pipe Thread (NPT) plug installed in a sidewall of the weld electrode. At normal operating temperatures, the disc-shaped insert maintains a press-fit, snap-fit, or other mechanical engagement with the NPT plug to retain cooling system pressure. If loss of cooling occurs, the weld electrode heats up; this, in turn, will lower the modulus (softening) of the disk-shaped insert until the mechanical engagement is released. The welding cell's cooling system software will detect the leak of coolant from the shank and responsively shut down the welding cell. A "cap loss" alarm may be detected, and the weld cell shutdown, within 0.3 seconds of initialization of the coolant leak in the shank. Disclosed loss-of-cooling detection assemblies are low cost and compact in size, offering expedited detection of cooling functionality loss and attendant cost saving from reduced discrepant welds and mitigated damage to the weld equipment.

Referring now to the drawings, wherein like reference numbers refer to like features throughout the several views, there is shown in FIG. 1 an illustration of a representative electric welding system, which is designated generally at 10 and portrayed herein for purposes of discussion as a robotic electric resistance welding (ERW) cell. The illustrated robotic ERW cell 10—also referred to herein as "welding system" for short—is merely an exemplary application with which novel aspects and features of this disclosure may be practiced. In the same vein, implementation of the present concepts for resistance welding techniques should also be appreciated as an exemplary application of the novel concepts disclosed herein. As such, it will be understood that aspects and features of the present disclosure may be incorporated into other weld system architectures, and may be implemented for any logically relevant type of welding operation. By way of example, the present features can be applied to other electric welding processes, including liquid-cooled arc welding and plasma cutting systems, in both 2-dimensional and 3-dimensional applications. In addition, the systems, methods and devices provided herein can be employed for operating on a single workpiece, for joining together two or more workpieces, or for joining together two segments of a single workpiece. Lastly, the drawings presented herein are not necessarily to scale and are provided purely for instructional purposes. Thus, the specific and relative dimensions shown in the drawings are not to be construed as limiting.

Robotic welding cell 10 of FIG. 1 is generally represented in the drawings by a free-standing, computer-automated robot 12 that communicates, e.g., wired or wirelessly, with an electronic robot weld controller 14 that governs operation of the robot 12. An end effector, portrayed herein as a C-type spot welding gun 16, is attached to the robot 12 to allow the robot 12 to perform one or more tasks on a workpiece 11, including but not limited to loading, unloading, assembling, adjusting, welding, and/or inspecting parts. As will be described in further detail hereinbelow, the weld gun 16 is designed to selectively complete one or more welding operations at one or more weld points along one or more workpieces 11. Movement of the robot 12 may be provided by means of servomotors, linear and rotational transducers, pneumatic actuators, hydraulic actuators, or by any other type of logically applicable actuation mechanism. In the same vein, the robot 12 may have six degrees of freedom of motion, as shown, or have any other suitable number of degrees of freedom of motion.

In the illustrated example, the weld gun 16 is mounted to a robot arm 18 in a repositionable and re-orientable manner. In the figure, denoted at 20, is a mechanical joint—more commonly referred to in the art as a "robot wrist"—for movably mounting the weld gun 16 to the robot arm 18 in a pivotable and rotatable manner. For example, the weld gun 16 is operable to rotate about a first axis A1 extending longitudinally through the center of the arm 18, and pivot about a second axis A2 extending transversely with respect to the arm 18 via the robot wrist 20. The weld gun 16 also includes a pivot mounting bracket 22 adjacent the robot wrist 20 at which first and second welding gun finger 24 and 26, respectively, are mounted to open and close about the workpiece 11. Each welding gun finger 24, 26 includes a respective weld electrode 28 and 30 at corresponding tip ends thereof. These electrodes 28, 30 are arranged to be juxtaposed in opposing relation with one another when the fingers 24, 26 are moved to the closed position, e.g., such that the electrodes 28, 30 clamp the workpiece 11 with a force of about 500 to 1,500 pounds. An actuator or servomechanism 32, which is fixed adjacent to the pivot mounting bracket 22, is operable, e.g., via robot weld controller 14, to open and close the welding gun fingers 24, 26 and, thus, the weld electrodes 28, 30. The servomechanism 32 can be, by way of example, an electric, pneumatic, hydraulic, or magnetic device, or a combination thereof.

With continuing reference to FIG. 1, a stationary base 34 operatively supports the robot 12 and, thus, the weld gun 16. The robot 12 is shown as a freestanding apparatus, e.g., with the base 34 seated on and fixed to a factory floor. However, it should be appreciated that the base 34 and, thus, the robot 12 can be mounted at various other locations in a variety of different manners, including, but not limited to, a factory wall, ceiling, support truss, wheeled base, etc., without departing from the scope of this disclosure. An articulating joint assembly 36 is movably mounted on the base 34 for a swivel movement about a vertical axis via a swivel frame 38 and support post 40. The swivel movement of the robot 12 is produced, for example, by means of a servomotor 42 or other servomechanism that is provided on the swivel frame 38. The controller 14 is programmed, at least in part, to control the automation of the robot 12, including movement of all corresponding robot components. By way of example, the controller 14 regulates the swiveling of swivel frame 38 on the base 34, the pivoting of support post 40 on the swivel frame 38, articulation of robot arm 18 with respect to the support post 40, and the rotating and pivoting of weld gun 16 via the robot wrist 20. Robot weld controller 14 is also programmed to control the selective welding operations of the weld gun 16, including the opening/separation and closing/clamping of the welding gun fingers 24, 26 and corresponding activation and deactivation of the weld electrodes 28, 30.

As indicated above, robot weld controller 14 is constructed and programmed to automate, among other things, the movement and operation of the robot 12 and welding gun 16. Control module, module, controller, control unit, electronic control unit, processor, and any permutations thereof may be defined to mean any one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.), whether resident, remote or a combination of both, executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms may be defined to mean any controller executable instruction sets including calibrations and look-up tables. An electronic control unit (ECU) may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed at in real-time, continuously, systematically, sporadically and/or at regular intervals, for example, each 100 microseconds, 3.125, 6.25, 12.5, 25 and 100 milliseconds, etc., during ongoing use or operation. Alternatively, routines may be executed in response to occurrence of an event.

In the inset view of FIG. 1 there is shown an enlarged cross-sectional illustration of a portion of one of the weld gun 16 electrodes, namely the second (bottom) weld electrode 30. While differing in location and orientation, the first (primary) weld electrode 28 may be similarly configured to include any of the features described below with respect to the second weld electrode 30. As shown, the weld electrode 30 is generally composed of an electrically conductive, cylindrical shank 44 with an electrically conductive weld cap 46 telescopingly mounted onto a distal end of the shank 44. The weld shank and cap 44, 46 may be fabricated from any suitably conductive material, including copper and aluminum, precious metals gold and silver, as well as alloys and combinations thereof. The weld cap 46 is formed or machined to include a hemispherical or other suitably shaped tip 45 that will be pressed against a workpiece 11, e.g., in a stack of workpieces comprised of multiple panels or a panel and a support frame that are to be welded together. Weld cap 46 of FIG. 1 is fabricated with a cylindrical skirt 47 that projects from the cap tip 45 and closely surrounds the shank 44. This skirt 47 is shown press-fit onto the shank 44; however, in alternative configurations, the skirt 47 may have internal threads that screw onto mating external threads on the shank 44.

According to the illustrated example, an internal cavity 49 of the weld cap 46 cooperates with an interior coolant bore 43 of the weld shank 44 to define a coolant chamber 48 through which fluid is circulated to cool the weld electrode 30. A supply conduit, such as coolant supply tube 50, extends coaxially through the center of the shank 44 and into the coolant chamber 48. Coolant supply tube 50 has a distal end with an opening that is spaced away from the underside of the cap tip 45. An opposing proximal end of the supply tube 50 is fluidly connected to a coolant fluid source, such as coolant tank 52, via a coolant pump 54 or other coolant pressurizing mechanism. Coolant fluid, which is represented in the drawings by arrows 56, flows through the coolant supply tube 50 to provide a constant flow of coolant fluid 56 through the coolant chamber 48. After passing through the internal cavity 49, the coolant fluid 56 flows through the space between the shank 44 and the supply tube 50 to a drain port 58. Coolant flow through the electrode assembly 30 will transfer heat away from the weld shank 44 and cap 46. A differential flow sensor 60, which may be fluidly interposed between the supply conduit 74 and a return conduit 76, detects differential fluid flow of the coolant fluid 56 entering and exiting the bore 43 and cavity 49. This differential flow sensor 60 may be embodied as any available and logically relevant sensing device, including fluid flow transducers, capacitive differential flow sensors, strain-gauge sensors, and the like.

Figure 2:
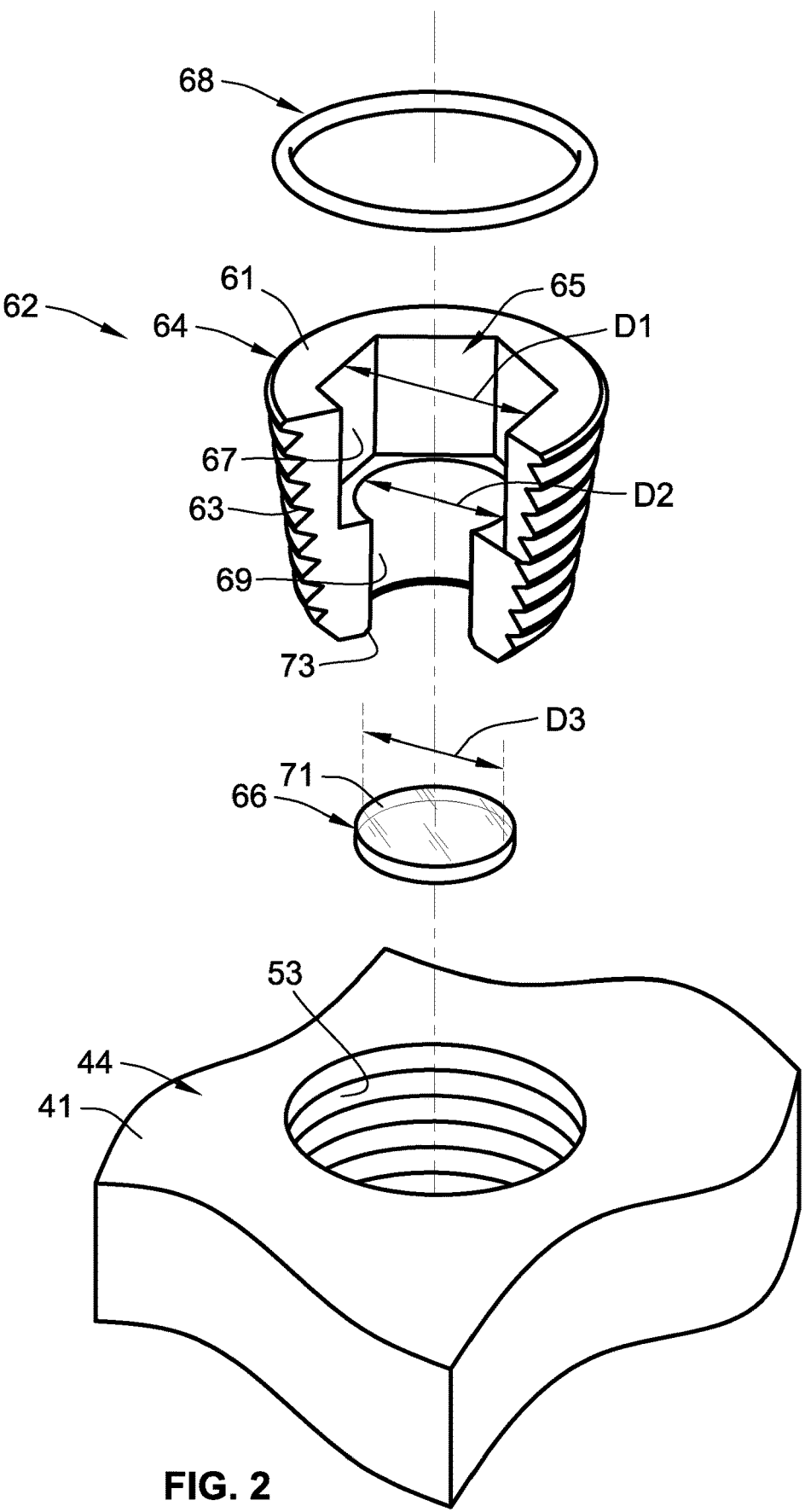
FIG. 2 is an exploded perspective-view illustration of the representative loss-of-cooling detection plug assembly of FIG. 1.

With collective reference to both FIGS. 1 and 2, the welding system 10 is equipped with a loss-of-cooling detection assembly, designated generally at 62, to help detect inadvertent cessation or interruptions in cooling functionality in the liquid-cooled weld electrode 30. In accord with the illustrated example, the detection assembly 62 (also referred to herein as "plug assembly") is a bipartite construction that may consist generally of a plug 64 and an insert 66. Depending on application requirements, the detection assembly 62 may optionally employ a seal member, illustrated as a toroidal "O-ring" gasket 68 in FIG. 2, that sits against and extends continuously around an outer-diameter surface at the upper extent of the plug body 61 to fluidly seal the interface between the plug 64 and the weld shank 44. The plug 64 may be constructed from any rigid, durable, and corrosion-resistant material, such as thermoplastic polymers and other plastic materials, or aluminum, stainless steel, copper and other metals, or combinations thereof. It is envisioned that the loss-of-cooling detection plug assembly 62 include greater or fewer parts than those enumerated above. As an example, it is possible to eliminate the plug 64 altogether or integrally form the plug 64 with the shank 44; in either such instance, the insert 66 would be mounted directly to the weld shank 44. Likewise, the O-ring gasket 68 could be eliminated and replaced with an adhesive.

Plug 64 is illustrated in FIG. 2 with a single-piece body 61 that mounts the plug assembly 62 to a sidewall 41 of the weld electrode's shank 44. By way of non-limiting example, the plug body 61 of FIG. 2 has an elongated, frustaconical shape with external helical (male) threads 63 on an exterior surface of the body 61. The threads 63 of the plug 64 threadably mesh with complementary internal helical (female) threads 53 in a plug bore in the sidewall 41 of the weld shank 44. After the plug 64 is properly mounted, a clearance hole 65 extending completely through the plug body 61 fluidly connects to the interior coolant bore 43 of the weld shank 44 such that a marginal, yet detectable amount of fluid 56 can pass through the hole 65 when unobstructed. While it is imagined that the clearance hole 65 may have a generally symmetrical geometry e.g., with a substantially constant diameter, the representative configuration is portrayed as including two adjoined sections 67 and 69, respectively, each of which has a distinct shape and size. The first section 67 of the clearance hole 65, for instance, has a polygonal transverse cross-section with a first minimal or inscribed diameter D1. Contrastingly, the second section 69 has a circular transverse cross-section with a second diameter D2, which is less than the first diameter D1. This clearance hole 65 is provided with individually sized openings at opposing ends of the plug body 61.

When the loss-of-cooling detection plug 62 is fully assembled and the weld electrode 30 is operating within normal temperature ranges, the insert 66 is operatively attached to the plug body 61, fluidly sealing the clearance hole 65 such that coolant fluid 56 is substantially or completely restricted from passing from the coolant chamber 48, through the plug 64, and out of the shank 44. According to the illustrated example, the insert 66 is seated inside the second section 69 of the clearance hole 65, and mechanically coupled to an inner-diameter surface of the plug body 61. By way of example, and not limitation, the insert 66 of FIG. 2 is manufactured as a single-piece, disk-shaped body 71 with a third diameter D3 that is slightly greater than the second section's diameter D2. With this configuration, pressing the disk-shaped body 71 into the clearance hole 65 creates an interference fit (also categorized as a "press fit" or "friction fit") between the insert 66 and plug 64. To assist with the assembly process, the plug body 61 is provided with a tapered surface 73 within the opening in the bottom end of the plug 64. This tapered surface 73 is obliquely angled with respect to, and adjoins with, the inner-diameter surface of the clearance hole 65 and the bottom surface of the plug body 61. When pressing the insert 66 into the plug 64, the disk-shaped body 71 slides along and is progressively compressed by the tapered surface 73. While shown using a press-fit engagement, other types of mechanical mating engagements can be used to operatively attach the plug 64 and insert 66, including threaded engagement, snap-fit engagement, keyed engagement, etc. With this arrangement, the plug assembly 62 eliminates the need for each and every one of the following: adhesives, fasteners, and brackets for mounting the insert 66 to the plug 64.

Upon interruption or loss of cooling in the weld electrode 30, the operating temperature of the shank 44 will gradually increase, causing a concomitant increase in the operating temperature of the plug assembly 62. Once this temperature exceeds a calibrated minimum temperature, e.g., equal to or greater than the glass transition temperature (Tg) of the insert 66, the disk-shaped body 71 will soften and change shape and/or size. When this physical property of the disk-shaped body 71 is altered, the insert 66 loses its mechanical engagement with the plug 64 and unseals the clearance hole 65. Depending on fluid pressure, the insert 66 may be displaced within the clearance hole 65 and ejected from the plug 64. In this regard, the disk-shaped body 71 of the insert 66 is fabricated, in whole or in part, from a polymeric material that will alter its shape, size, and/or other physical property in response to a predetermined change in temperature or pressure, or both, of the coolant fluid 56 in the interior coolant bore 43 of the weld shank 44. It may be desirable, for at least some optimal configurations, that the insert 66 be fabricated entirely from a shape memory polymer. This SMP material of the insert 66 is temperature sensitive, designed to transition back and forth between a stored (permanent) form and a current (temporary) form, which is distinct from the stored form. With this configuration, a predetermined temperature differential in the coolant fluid 56 causes the insert 66 to transition from the stored form to the temporary form. This will generate a detectable leak that is indicative of loss of cooling in the weld system.

According to aspects of the disclosed concepts, the polymeric disc-shaped insert 66 provides fluid sealing engagement at water pressures of at least approximately 80 pounds per square inch gauge (psig) or, for some applications, at least about 120 psig up to a maximum normal operating temperature of about 100° F. (38° C.) with a security factor. For at least some embodiments, the polymeric disc-shaped insert 66 will unseal and/or eject from the plug 64 before coolant fluid 56 reaches boiling point, e.g., of about 212° F. (100° C.) at atmospheric pressure. Security factors help to ensure no false positives or false negatives (helps to emulate current conditions). In general, the insert 66 stays in place as long as frictional forces from the mechanical (press-fit) engagement exceeds forces from coolant pressure. Between about 40° C. and 100° C., an SMP insert may experience a 200× reduction in stiffness (storage modulus). With this characteristic, an SMP insert 66 may be designed to hold at normal operating pressure and temperature with a high security factor to avoid false positives, while providing a security factor to ensure that the SMP insert 66 will unseal and/or eject at elevated temperatures but before 100° C. In a representative example, the disc-shaped insert 66 has a diameter of approximately 5.1 mm and a thickness of approximately 1.1 mm. In this example, the plug is a ⅛ inch male-thread NPT hex-head pipe plug.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A loss-of-cooling detection assembly for a weld electrode of a welding system, the weld electrode including a weld cap mounted to a weld shank with a coolant bore, and the welding system including one or more fluid conduits fluidly coupling a coolant fluid source to the coolant bore of the weld shank, the loss-of-cooling detection assembly comprising:
    a plug configured to attach to the weld shank and fluidly couple to the coolant bore, the plug including a plug body with a clearance hole extending through the plug body, the plug body having an elongated, frustoconical shape; and
    an insert attached to the plug body and fluidly sealing the clearance hole, the insert being fabricated from a polymeric material configured to alter a physical property of the insert, responsive to a predetermined change in temperature and/or pressure of a coolant fluid in the coolant bore, and thereby unseal the clearance hole.

2. The loss-of-cooling detection assembly of claim 1, wherein the clearance hole includes adjoined first and second sections, the first section having a first diameter and the second section having a second diameter less than the first diameter, and wherein the insert is seated inside the second section of the clearance hole.

3. The loss-of-cooling detection assembly of claim 2, wherein the insert is disk-shaped with a third diameter greater than the second diameter of the second section.

4. The loss-of-cooling detection assembly of claim 1, wherein the clearance hole includes adjoined first and second sections, and wherein the first section has a polygonal transverse cross-section, and the second section has a circular transverse cross-section.

5. The loss-of-cooling detection assembly of claim 1, wherein the insert is seated inside the clearance hole and interference-fit to the plug body.

6. A loss-of-cooling detection assembly for a weld electrode of a welding system, the weld electrode including a weld cap mounted to a weld shank with a coolant bore, and the welding system including one or more fluid conduits fluidly coupling a coolant fluid source to the coolant bore of the weld shank, the loss-of-cooling detection assembly comprising:
    a plug configured to attach to the weld shank and fluidly couple to the coolant bore, the plug including a plug body with a clearance hole extending through the plug body, wherein the plug includes external threads on an exterior surface of the plug body, the external threads being configured to threadably mate with complementary internal threads in a plug bore of the weld shank to thereby attach the plug to the weld shank; and
    an insert attached to the plug body and fluidly sealing the clearance hole, the insert being fabricated from a polymeric material configured to alter a physical property of the insert, responsive to a predetermined change in temperature and/or pressure of a coolant fluid in the coolant bore, and thereby unseal the clearance hole.

7. The loss-of-cooling detection assembly of claim 1, wherein the polymeric material of the insert includes a shape memory polymer.

8. The loss-of-cooling detection assembly of claim 7, wherein the insert has a stored form and a temporary form distinct from the stored form, and wherein the shape memory polymer is temperature sensitive such that a predetermined temperature differential in the coolant fluid causes the insert to transition from the stored form to the temporary form.

9. A loss-of-cooling detection assembly for a weld electrode of a welding system, the weld electrode including a weld cap mounted to a weld shank with a coolant bore, and the welding system including one or more fluid conduits fluidly coupling a coolant fluid source to the coolant bore of the weld shank, the loss-of-cooling detection assembly comprising:
   a plug configured to attach to the weld shank and fluidly couple to the coolant bore, the plug including a plug body with a clearance hole extending through the plug body, wherein the clearance hole includes first and second openings at opposing first and second ends of the plug body, respectively, the plug body having a tapered surface connecting the second end of the plug body to the clearance hole at the second opening; and
   an insert attached to the plug body and fluidly sealing the clearance hole, the insert being fabricated from a polymeric material configured to alter a physical property of the insert, responsive to a predetermined change in temperature and/or pressure of a coolant fluid in the coolant bore, and thereby unseal the clearance hole.

10. The loss-of-cooling detection assembly of claim 1, further comprising a seal extending around the plug body and configured to fluidly seal an interface between the plug and the weld shank.

11. The loss-of-cooling detection assembly of claim 1, characterized by an absence of any and all the following: an adhesive, a fastener, and a bracket for mounting the insert to the plug body.

12. The loss-of-cooling detection assembly of claim 1, wherein the plug further includes external threads on an exterior surface of the plug body, the external threads being configured to threadably mate with complementary internal threads in a plug bore of the weld shank to thereby attach the plug to the weld shank.

13. The loss-of-cooling detection assembly of claim 1, wherein the clearance hole includes first and second openings at opposing first and second ends of the plug body, respectively, the plug body having at the second opening thereof a tapered surface connecting the second end of the plug body to the clearance hole.

14. The loss-of-cooling detection assembly of claim 6, wherein the clearance hole includes adjoined first and second sections, the first section having a first diameter and the second section having a second diameter less than the first diameter, and wherein the insert is seated inside the second section of the clearance hole.

15. The loss-of-cooling detection assembly of claim 6, wherein the plug body has an elongated, frustoconical shape.

16. The loss-of-cooling detection assembly of claim 6, wherein the insert is seated inside the clearance hole and interference-fit to the plug body.

17. The loss-of-cooling detection assembly of claim 6, wherein the polymeric material of the insert includes a shape memory polymer.

18. The loss-of-cooling detection assembly of claim 9, wherein the clearance hole includes adjoined first and second sections, the first section having a first diameter and the second section having a second diameter less than the first diameter, and wherein the insert is seated inside the second section of the clearance hole.

19. The loss-of-cooling detection assembly of claim 9, wherein the plug body has an elongated, frustoconical shape.

20. The loss-of-cooling detection assembly of claim 9, wherein the insert is seated inside the clearance hole and interference-fit to the plug body.

* * * * *